United States Patent [19]

Tuscher et al.

[11] 4,028,198

[45] June 7, 1977

[54] METHOD OF FORMING A REINFORCING LAYER ON THE INNER WALL OF THE COMBUSTION AND/OR THRUST NOZZLES FOR A LIQUID ROCKET ENGINE

[75] Inventors: Otto Tuscher, Munich; Johann Tewich, Ottobrunn, both of Germany; Willibald Wittich, deceased, late of Ottobrunn, Germany

[73] Assignee: Messerschmitt-Bolkow-Blohm GmbH, Munich, Germany

[22] Filed: Feb. 10, 1975
(Under Rule 47)

[21] Appl. No.: 548,619

[30] Foreign Application Priority Data

Feb. 14, 1974 Germany .......................... 2406976

[52] U.S. Cl. .................................. 204/9; 204/15; 204/26
[51] Int. Cl.² ...................... C25D 1/02; C25D 5/16
[58] Field of Search ................ 204/15, 9, 26, 225, 204/226, DIG. 7

[56] References Cited

UNITED STATES PATENTS

| 742,131 | 10/1903 | Pratt | 204/26 |
|---|---|---|---|
| 1,733,404 | 10/1929 | Fahrenwald | 204/212 |
| 2,138,938 | 12/1938 | Plensler | 204/DIG. 7 |
| 2,943,030 | 6/1960 | Tchejeyan | 204/15 |
| 3,692,637 | 9/1972 | Dederra et al. | 204/9 |
| 3,738,916 | 6/1973 | Butter et al. | 204/9 |

*Primary Examiner*—T. M. Tufariello
*Attorney, Agent, or Firm*—Toren, McGeady and Stanger

[57] ABSTRACT

In forming the inner wall for the combustion chamber and/or thrust nozzles of an liquid rocket engine which is shaped with inwardly directed projections to form cooling ducts closed outwardly by the outer wall, a reinforcing layer is electroplated at least on the radially inner surfaces of the inwardly directed projections. The inner wall is rotatably supported within an electrolyte bath with the material-depositing electrode located on the central axis of the inner wall and only the surface to receive the reinforcing layer is located below the surface of the bath. The reinforcing layer is provided only over a part of the axially extending length of the inner wall and a tapering transition section is provided from the radially inner surface of the reinforcing layer to the inner surface of the inner wall by gradually lifting or lowering the inner wall within the electrolyte bath during the electroplating operation.

6 Claims, 4 Drawing Figures

METHOD OF FORMING A REINFORCING LAYER ON THE INNER WALL OF THE COMBUSTION AND/OR THRUST NOZZLES FOR A LIQUID ROCKET ENGINE

SUMMARY OF THE INVENTION

The present invention is directed to the formation of the inner and outer walls of the combustion chamber and/or thrust nozzles of a liquid rocket engine and, more particularly, it concerns the formation of a reinforcing layer on the inner surface of the inner wall which is shaped to provide laterally spaced cooling ducts in the form of troughs which are closed outwardly by the outer wall.

It is known after forming the inner wall shaped to provide inwardly directed cooling ducts on a core having the negative form of the inner wall with the cooling ducts, to fill the cooling ducts with a fusible, electrically conductive material, for example, Woods alloy or a conductive wax. A second layer is electroplated over the filled cooling ducts and forms the outer wall. After adding the usual inlet and outlet rings for the cooling ducts, the material filled into the ducts is removed in a molten form.

Due to the extremely high temperatures of the propellant gases generated in a rocket combustion chamber, the cooling of the combustion chamber and thrust nozzle walls still presents problems which can only be solved by very costly procedures, because of the requirement in rocket engineering for a low overall weight. In known combustion chamber walls the radially inner surfaces of the cooling ducts which project more deeply into the path of flow of the hot propellant gases, represent thermally critical zones, since they are exposed to the "fire" to a greater extent. Further, the radially inner surfaces or apex regions of the cooling ducts are thinner in the electroplating of such a combustion chamber inner wall with relatively great depth of the cooling ducts, because of unequal voltage distribution and the lower voltage field in the base of the cooling ducts.

The primary object of the present invention is to provide a method for improving the properties of the inner wall of known combustion chamber and/or thrust nozzle walls in liquid rocket engines.

In accordance with the present invention, after the core used in the formation of the inner wall has been removed, an inner reinforcing layer or additional reinforcing layers of the same or different material are electroplated on the originally deposited inner wall of the combustion chamber and/or thrust nozzle at least over the apex region, that is the radially inwardly directed surfaces of the inner wall which define the cooling ducts. The electrode or electrodes used in the electroplating operation are positioned within the interior of the inner wall.

Since the mechanical and especially the thermal stresses of a combustion chamber and/or thrust nozzle vary over its axial length, it may be advisable, according to the invention, to apply the reinforcing layers only over one or more axially extending sections of the combustion chambers and/or thrust nozzles. The reinforced regions are those, like the convergent part of the thrust nozzle neck, which are extremely highly stressed thermally, or they are regions where there is a low velocity of flow of the cooling agent which exist because of the arrangement of the engine or because of problems in the engine, for transforming the cooling agent into a vapor form. In these particular regions, a large cross-sectional area within the cooling ducts is required and such large cross-sectional areas can be obtained by providing the ducts with a greater depth extending into the path of the propellant gases. Accordingly, reinforcement of the coolant duct wall is required for two reasons. First because the wall becomes thinner during the electroplating operation and, second, because the apices or crowns of the cooling ducts extend further into the "fire" of the hot propellant gases so that the reinforcing layer affords a longer service life for the cooling duct and permits higher specific outputs.

The particular advantage obtained by the present invention is that the weaknesses in the inner wall due to the electroplating formation of the trough-shaped cooling ducts by means of a material-depositing electrode arranged radially outwardly from the core supporting the inner wall during its formation, are compensated by the formation of reinforced layers on the apex regions, that is, the radially inner regions, of the cooling ducts by means of an electrode arranged radially inwardly of the inner wall. With the radially inner location of the electrode, the greatest current density occurs at the apex regions. This feature of the invention can be used for special reinforcements which go beyond the mere compensation of the material such as for special multi-layered reinforcements, for example, as protection against chemical attack by the hot propellant gases. Additionally, a particularly homogeneous wall structure with a good heat transfer is obtained by the electroplating of the reinforcement after reactivation of the surface of the originally deposited inner wall layer.

In carrying out the method of electroplating the reinforcement layer, the combustion chamber and/or thrust nozzle is rotatably supported from a frame with the material-depositing electrode centrally positioned within the inner wall. The portion of the inner wall which is to receive the reinforcing layer is submerged into the electrolytic bath until the level of the bath is in the range where the reinforcing layer terminates. A tapered transition section of the reinforcing layer is formed by gradually lifting or lowering the inner wall relative to the electrolytic bath during the plating operation to provide the transition between the reinforcing layer and the inner surface of the inner wall which is free of any break or imperfection in the integrity of the layer.

If a reinforcing layer or layers, increasing uniformly in thickness, are to be formed on the inner wall of the combustion chamber and/or thrust nozzle, the inner wall is withdrawn at a steady rate out of the electrolytic bath over the length of the layer being formed during the electroplating operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
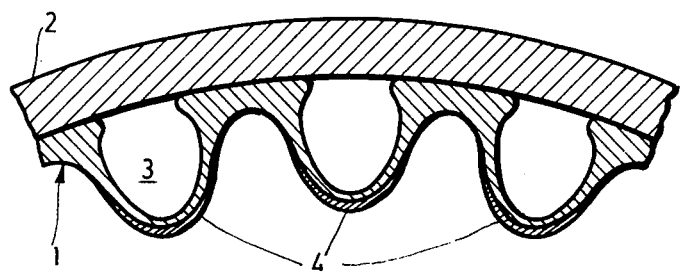
FIG. 1 is a transverse cross-sectional view of a portion of the wall of a combustion chamber and/or thrust nozzle of a liquid rocket engine.

In FIG. 1 it can be seen that the combustion chamber and/or thrust nozzle includes a radially inner wall 1 and a radially outer wall 2 in contact with the inner wall at angularly spaced locations. The inner surface of the inner wall has an undulating or corrugated-like shape and forms a plurality of laterally spaced individual cooling ducts 3 in the form of troughs. The radially inner surface of the outer wall 2 spans and closes the radially outer ends of the ducts 3. The inner wall 1 is formed by electroplating a first layer on the surface of a core having the negative form of the radially inner surface of the inner wall. After the cooling ducts have been filled with an electrically conductive material, such as Woods alloy or a conductive wax, the outer layer is applied over the inner wall as a second electroplated layer.

Figure 2:
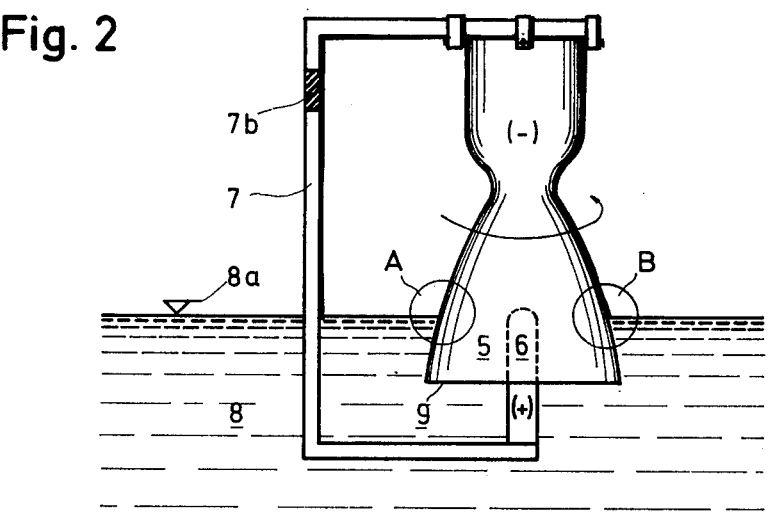
FIG. 2 is a schematic elevational view of a combustion chamber and thrust nozzle partially submerged within an electrolytic bath.

As can be seen in FIG. 1, the apex regions of the cooling ducts 3, that is, the radially inner surfaces of the inner wall projecting inwardly from the outer wall in forming the cooling ducts, are provided with a reinforcing layer 4 and this layer is formed by electroplating, using an electrode 6 centered within the interior of the combustion chamber and/or thrust nozzle interior 5, note FIG. 2. The electrode 6 is rigidly connected over a frame 7 to the combustion chamber-thrust nozzle and it is electrically insulated from it by an insulator 7b. The combustion chamber-thrust nozzle is rotatably mounted from the frame 7 and the frame and the electrode 6 are arranged in a stationary manner. Accordingly, the combustion chamber-thrust nozzle can be rotated relative to the stationary electrode. In the arrangement shown in FIG. 2, only that portion of the axial length of the combustion chamber-thrust nozzle which is located below the level 8a of the electrolytic bath 8 receives the electroplated reinforcing layer 4, that is, only that portion of the inner wall extending between the lower end 9 of the combustion chamber-thrust nozzle and the level 8a of the bath.

Figure 3:
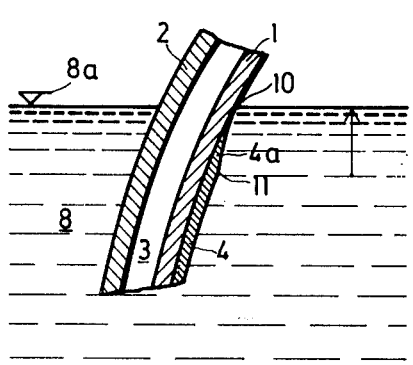
FIG. 3 is an enlarged detail view of the encircled portion A of FIG. 2.
Figure 4:
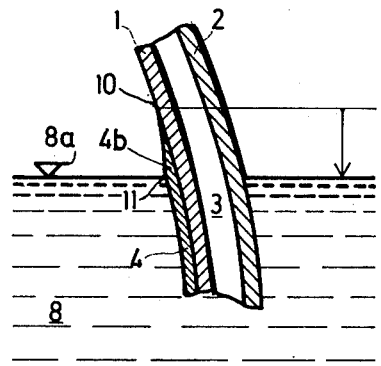
FIG. 4 is an enlarged detail view of the encircled portion B of FIG. 2.

As illustrated in FIGS. 3 and 4, the upper end of the reinforcing layer 4 has a tapered section or ramp 4a, 4b which extends from the radially inner surface of the reinforcing layer to the radially inner surface of the inner wall 1. In FIG. 3, the tapered section 4a is formed by initially locating the line 10 on the inner wall 1 at the level 8a of the electrolytic bath 8 and then continuously withdrawing the combustion chamber-thrust nozzle upwardly out of the bath during the electroplating operation to provide the tapered section 4a. At the end of the electroplating operation, the line 11 is located at the level 8a so that below the line 11 a uniform deposition of the layer has been effected while above line 11 the reinforcing layer 4 tapers to the line 10.

In FIG. 4 the procedure used in FIG. 3 is reversed with the inner wall 1 at the outset of the plating operation being arranged with the line 11 at the level 8a and then as the electroplating proceeds the combustion chamber-thrust nozzle is dipped or lowered into the electrolytic bath 8 until the line 10 is reached at the completion of the plating procedure. As a result, the tapered layer 4b is provided. Using either the arrangement disclosed in FIG. 3 or FIG. 4, it is possible to afford a transition from the full thickness of the layer to the inner surface of the inner wall 1 without any breaks or imperfections within the reinforcing layer which would have a deleterious effect on the operation of the combustion chamber-thrust nozzle.

While specific embodiments of the invention have been shown and described in detail to illustrate the application of the inventive principles, it will be understood that the invention may be embodied otherwise without departing from such principles.

What is claimed is:

1. A method of forming the combustion chamber and/or thrust nozzle of a liquid rocket engine having an inner wall and an outer wall with laterally spaced cooling ducts located between the inner wall and outer wall and formed by shaping the inner wall with laterally spaced inwardly extending projections forming troughs closed by the outer wall and the inwardly facing surface of the inner wall having a corrugated-like shape, comprising the steps of electroplating a layer on a core having the negative form of the inner wall with the troughs formed therein for forming the inner wall with the cooling ducts, and removing the core, wherein the improvement comprises, after the removal of the core, electroplating a reinforcing layer at least on the radially inwardly projecting portions of the inner surface of the inner wall the radially outer surfaces of which projecting portions in combination with the radially inwardly facing surfaces of said outer wall define the cooling ducts, and effecting the electroplating by positioning the inner wall within an electrolytic bath and locating a material-depositing electrode within the bath equidistantly spaced radially inwardly of the inner wall.

2. A method, as set forth in claim 1, comprising the step of depositing the reinforcing layer only on a portion of the axial length of the inner wall.

3. A method, as set forth in claim 1, including the steps of positioning the inner wall with its central axis extending vertically and supporting the inner wall for rotation about the central axis, locating the material-depositing electrode along the central axis of the inner wall, submerging the inner wall into the electrolytic bath to a level intermediate its ends, commencing the electroplating operation and as the electroplating operation proceeds continuously moving the inner wall axially for a selected distance to provide an axially extending tapering transition section from the full thickness portion of the reinforcing layer to the inwardly facing surface of the inner wall.

4. A method, as set forth in claim 1, comprising the steps of positioning the inner wall with its central axis extending vertically and supporting the inner wall for rotation about its central axis, locating the material-depositing electrode along the central axis of the inner wall, submerging the inner wall into the electrolytic bath to a level intermediate its ends, commencing the electroplating operation and, as the electroplating operation proceeds, continuously lifting the inner wall out of the electrolytic bath for a selected distance to provide an axially extending tapering transition section from the full thickness portions of the reinforcing layer to the inwardly facing surface of the inner wall.

5. A method, as set forth in claim 1, including the steps of positioning the inner wall with its central axis extending vertically and supporting the inner wall for rotation about its central axis, locating the material-depositing electrode along the central axis of the inner wall, submerging the inner wall into the electrolytic bath to a selected level intermediate its ends, commencing the electroplating operation and, as the electroplating operation proceeds, continuously lowering the inner wall axially for a selected distance to provide an axially extending tapering transition section from the full thickness portion of the reinforcing layer to the inwardly facing surface of the inner wall.

6. A method for the production of the combustion chamber and/or thrust nozzle of a liquid rocket engine having an inner wall and an outer wall with laterally spaced cooling ducts located between the inner wall and outer wall and formed by shaping the inner wall with laterally spaced inwardly extending projections forming troughs closed by the outer wall with the inwardly directed surface of the projections having a corrugated-like shape, comprising the steps of electroplating a layer on a core having the negative form of the inner wall with the troughs for forming the inner wall with the cooling ducts, filling the troughs with electrically conductive material, electroplating the outer wall on the inner wall so that the outer wall spans the troughs forming the cooling ducts, removing the electrically conductive material from within the cooling ducts, removing the core from the inner walls, wherein the improvement comprises, after the removal of the core, electroplating a reinforcing layer at least on the radially inwardly projecting portions of the inner surface of the inner wall which projections define the cooling ducts and effecting the electroplating by positioning the inner wall with its central axis extending vertically and supporting the inner wall for rotation about its central axis, locating the material-depositing electrode along the central axis of the inner wall with the electrode extending upwardly from the lower end of the inner wall for only a portion of the axial length of the inner wall, submerging the inner wall into the electrolytic bath to a selected level intermediate its ends, commencing the electroplating operation and during the electroplating operation continuously moving the inner wall axially for a selected distance to provide an axially extending tapering reinforcing layer to the inwardly facing surface of the inner wall.

* * * * *